June 27, 1950

M. J. ARNDT
TELEPHONE SWITCHBOARD MOUNTING PLATE
WITH PLUG IN COMPONENTS 2,512,908

Filed Oct. 16, 1947

2 Sheets-Sheet 1

INVENTOR.
MELVIN J. ARNDT
DECEASED
BY MINA M. ARNDT
ADMINISTRATRIX

T. L. Bowes
ATTORNEY

June 27, 1950 M. J. ARNDT 2,512,908

TELEPHONE SWITCHBOARD MOUNTING PLATE WITH PLUG IN COMPONENTS

Filed Oct. 16, 1947 2 Sheets-Sheet 2

INVENTOR.
MELVIN J. ARNDT
DECEASED
BY MINA M. ARNDT
ADMINISTRATRIX
T. L. Bowes
ATTORNEY Patented June 27, 1950 2,512,908

UNITED STATES PATENT OFFICE 2,512,908

TELEPHONE SWITCHBOARD MOUNTING PLATE WITH PLUG-IN COMPONENTS

Melvin J. Arndt, deceased, late of Rochester, N. Y., by Mina M. Arndt, administratrix, Rochester, N. Y., assignor to Stromberg-Carlson Company, a corporation of New York Application October 16, 1947, Serial No. 780,165

4 Claims. (Cl. 179—91)

This invention relates to telephone systems and more particularly to mounting plates for use with telephone switchboards employed in automatic telephone systems.

There have been proposed telephone systems in which circuit components including relays, resistors, capacitors and switches have been grouped in such a manner that all components associated with a given portion of the system have been localized as by mounting on a single panel associated with a suitable switchboard. For example, all circuit components associated with a finder may be assembled on a single mounting element. In such an arrangement, it is advantageous to have the mounting element or plate arranged to be connected to other portions of the system by means of a plug and jack arrangement so that the mounting plate is easily removed for maintenance or repair and another plate substituted, or another unit added for improved service, or mounting plates with assembled components shipped separately from the frame so that the frame members can be assembled at the site of use or the frame assembled at the factory with switch cells, bare wire multiples, cables, etc., but with the switch and mounting or relay plate shipped separately.

It is an object of this invention to provide a new and improved mounting plate of the plug-in type which is simple, economical to manufacture and assemble, which is positively located, and which permits ready expansion of a telephone system as well as standardization of units thereof.

In accordance with the present invention a mounting plate of the plug-in type is provided with guide means for positively locating the plate and especially the plug assembly associated therewith, in both horizontal and vertical directions in a manner to prevent tipping of the plate with respect to the frame. For example, the mounting plate may be located in a vertical direction in such a way as to prevent tipping by means of a channel shaped guide arranged to receive a plug bracket carried by an end of the mounting plate, the channel having engagement with top and bottom surfaces of the terminal member or bracket, and in the horizontal direction by one or more locating pins and corresponding openings and recesses in the adjacent frame.

Other objects and advantages of my invention will become apparent as the following description proceeds, and the features of novelty which characterize my invention will be pointed out with particularity in the claims annexed to and forming a part of this specification.

Figure 1:
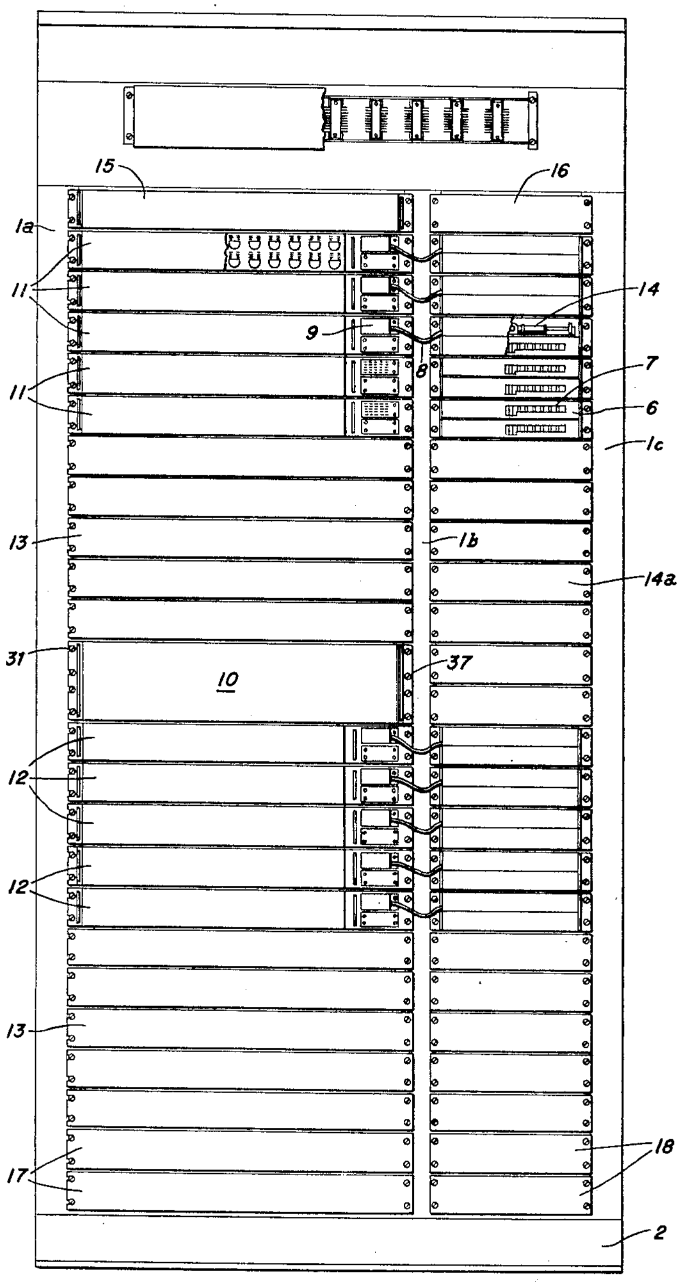
Figure 2:
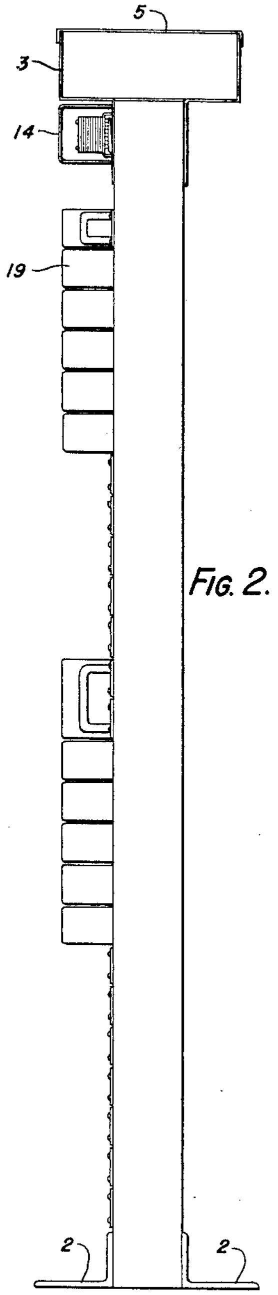

For a better understanding of my invention reference may be had to the accompanying drawings in which Fig. 1 is a front view illustrating a typical bay installation, Fig. 2 is an end view of the apparatus shown in Fig. 1, and Figs. 3 to 6, inclusive, are detailed views of the plug-in and guide arrangements incorporated in the apparatus shown in Figs. 1 and 2.

In the installation shown in the drawings, there is provided a frame comprising a plurality of spaced apart vertically extending members or columns 1a, 1b and 1c, which may be of any suitable cross section although hollow columns or channel shaped columns having suitable cover members are preferred to permit ready assembly or disassembly of wiring and cabling. The members or elements 1a, 1b and 1c are preferably formed of sheet metal bent to form rectangular columns. There is provided a base assembly which may comprise front and rear base or floor angles 2, the latter being suitably fastened to the floor or base as by welding or bolting depending upon the material of the floor, for example. If the angle members 2 are of suitable size and strength, the frame does not require bracing to walls or ceiling. There is provided a top rail 3 suitably connected across the front and rear sides of the vertical columns as by welding. The rectangularly shaped top rail as shown in Fig. 2 provides a suitable cable trough between the upright columns for carrying cabling to grading units 4 or terminal strips mounted in the columns 1a, 1b and 1c adjacent the top rails. The top rail or trough 3 may be closed by a suitable cover member 5.

There is shown a plurality of switch cells 6 carried between columns 1b and 1c, as by means of suitably threaded fastening members extending through suitable openings in the sides of the cells into suitably tapped openings in the columns. The switch cells illustrated are arranged to house two switches and to carry the bare wire multiples, as indicated by the numeral 7, on the rear of these cells. Each switch may be connected to the associated relay mounting plate by means of a suitable cable 8 and jack bracket 9, as explained more fully hereafter.

In the installation illustrated in the drawings, there has been provided a plurality of finder-selector links and an allotter for allotting the link assigned to an incoming call. The allotter is indicated by the numeral 10. There is provided space for ten finder relay mounting plates above the allotter. In the illustrated form of the invention, there are shown five finder mounting plates 11, each comprising two finder circuits.

Similarly, there is provided one selector circuit for each finder circuit and, therefore, there are illustrated five selector mounting plates 12 below the allotter 10, each comprising two selector circuits. Blank plates 13 cover unused spaces where added units may be assembled as required by increases in traffic from time to time.

At the right-hand portion of Fig. 1, there is shown a vertical row of switches 14, there being one switch for each finder and one switch for each selector. The unused spaces are conveniently closed by cover plates 14*a*. There have also been illustrated fuse panels 15 and 16 and spaces 17 and 18 for special circuits. Each mounting plate is provided with a cover 19 to protect the relays and other components mounted thereon from injury and to eliminate dirt. The switches 14 may be of the step-by-step type, known as the XY switch, the name being derived from the movements of the switch used therein, the movements in the primary and secondary directions of hunting or driving being at right angles in the same plane, preferably horizontal.

Figure 3:
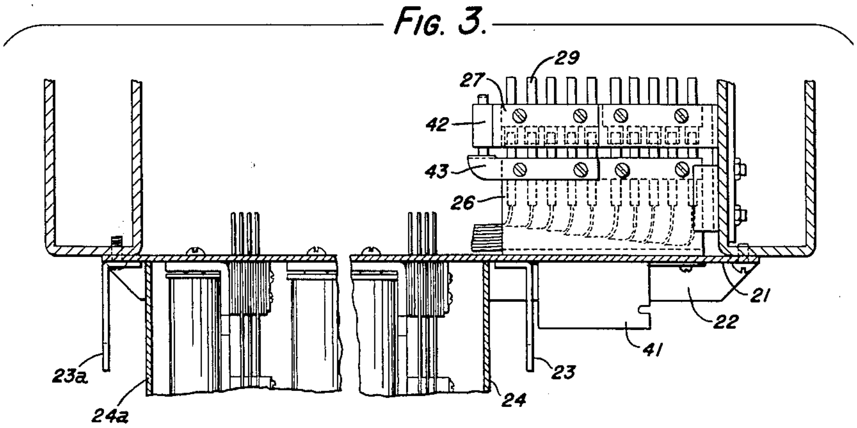

Referring to Figs. 3 to 6, inclusive, of the drawing, there are illustrated mounting features of any of the mounting plates shown in Figs. 1 and 2. Each mounting plate comprises a base member or plate 21 formed from any suitable material and provided with any suitable shape. In the preferred embodiment of this invention illustrated herein, plates 21 are formed and punched from suitable sheet metal, the edges being provided with outwardly directed flanges 22 to provide stiffness and also to provide surface for frictional engagement with covers 19. Suitable handles 23 may be provided at each end of each plate 21. The handles may be joined to plate 21 or flange 22, or both, in any suitable manner. In the preferred form of this invention, the cover members 19 are U-shaped in cross section, but open at the ends, the open ends being closed in the fully assembled condition by means of end plates 24 suitably attached to the plates 21. If preferred, the end plates 24 may be integral with the handles 23 as shown in Fig. 3.

Each mounting plate element 21 has a terminal element such as a plug bracket 26 mounted on the rear side and a corresponding terminal element such as a jack bracket 27 is carried by the frame. Each terminal element is provided with a plurality of corresponding electrical contacts. The terminal ends 28 and 29 of the plug and jack members are wired to relays, condensers, etc., as the case may be. The engaging contact portions 28*a* and 29*a* of the jack and plug brackets may have any suitable arrangement which will enable good electrical contact to be made. If a switch is associated with the mounting plate, there is also provided a jack or plug bracket 41 on the front side of the mounting plate as shown in Fig. 5 for engagement with a corresponding bracket or terminal member associated with the switch cable 8.

Figures 4, 5, 6:
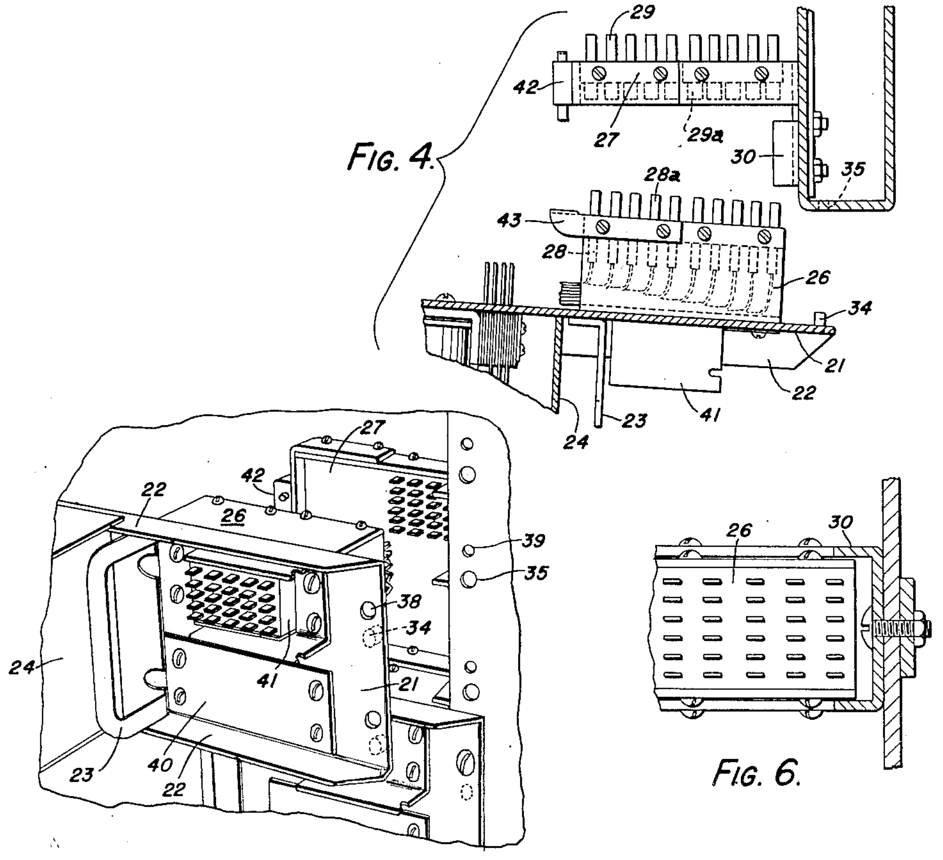

As best shown in Figs. 4 and 6, the plug bracket 26 is arranged to slide in close engagement with channel shaped locating guide means 30, having vertically spaced apart horizontal portions carried by one of the frame members as, for example, column 1*c*. The guide surfaces are of sufficient area and dimension and the corresponding laterally extending surfaces of terminal element 26 being of sufficient area and dimension to prevent tilting of the plate 21 during movement of the mounting plate toward its assembled position and to insure the proper alignment in the vertical direction of the contacts carried by the brackets 26 and 27. Guide 30 may be suitably mounted as by welding or a screw and nut arrangement as shown in Fig. 6.

The left-hand end of the mounting plate 21 is preferably provided with slotted mounting holes 31 as best seen in Fig. 1 to allow the mounting plate to be pivotally carried loosely on mounting screws 32 during movement of the mounting plate toward the assembled position so that the mounting plate will be supported during such movement while the other end is moved toward the frame.

Means is provided to insure the proper disposition of the plate in the horizontal direction in the form of transversely extending portions such as one or more locating pins 34 suitably mounted on the rear of plate 21 and arranged to enter suitable recesses or holes 35 in the frame member 1*c*.

In order to secure the mounting plate in position after the plug bracket 26 has been plugged into jack bracket 27, suitable fastening means 37 may be provided, as suitable bolts, for example, extending through openings 38 into engagement with suitably threaded openings 39 in the adjacent frame portion. It is understood that during assembly of the mounting plate the screws at the left-hand end of the mounting plate are left loose enough to permit a degree of pivotal motion, but after assembly these fastening members will be tightened down to firmly secure the plate in position.

Where there is no switch associated with the components mounted on a plate the opening, otherwise filled with a plug and jack bracket 41, may be closed by a suitable closure member or plate 40 and suitable fastening means.

If it is desired to make busy the circuit associated with any given mounting plate when the plate is removed, there may be provided a suitable switch 42 such as the type commonly referred to as a micro-switch and a suitable operating member 43 carried by plug and jack members 26 and 27, respectively, the switch being connected in a suitable circuit.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. The combination of a pair of spaced apart vertically extending frame members, a first terminal element having a plurality of electrical contacts, means for mounting said first element on one of said frame members, a mounting plate member, circuit components including relays, means for mounting said components on said mounting plate member, means for pivotally supporting one end of said mounting plate member at the other of said frame members during the process of mounting said plate member between said frame members, a second terminal element, means for mounting said second element on said plate member at the other end thereof, said second terminal element having a plurality of electrical contacts corresponding to the contacts of the first mentioned terminal element, guide means, means for mounting said guide means on at least one of said frame members, said guide means having vertically spaced apart horizontally disposed portions closely engaging the upper and lower edge portions of said second terminal element, said guide means being so positioned as to locate accurately the contacts of said second terminal element with respect to the vertical direction when the guide means engages the edges of said second element, the horizontal portions of said guide means and the corresponding edge portions of said second terminal element being of sufficient width to prevent relative tilting of said plate member with respect to said guide means during the movement of said plate member toward its assembled position, one of said members having a guide pin at said other end of said plate member, the other member at said other end having recess means for receiving said pin whereby said pin and said recess means locate said plate member horizontally when said plate member is urged toward its assembled position, said plate and frame members having additional matching openings to receive fastening members for securing said plate member in its assembled position, and fastening members inserted in said openings for securing said mounting plate member in assembled position at said other end.

2. The combination of a pair of spaced apart vertically extending frame members, a first terminal element having a plurality of electrical contacts, means for mounting said first element on one of said frame members, a mounting plate member, circuit components including relays, means for mounting said components on said mounting plate member, means for pivotally supporting one end of said mounting plate member at the other of said frame members during the process of mounting said plate member between said frame members, a second terminal element, means for mounting said second element on said plate member at the other end thereof, said second terminal element having a plurality of electrical contacts corresponding to the contacts of the first mentioned terminal element, guide means, means for mounting said guide means on at least one of said frame members, said guide means having vertically spaced apart horizontal portions closely engaging the upper and lower edge portions of said second terminal element, said guide means being so positioned as to locate accurately the contacts of said second terminal element with respect to the vertical direction when the guide means is engaged with the edges of said second element, the horizontally disposed portions of said guide means and the corresponding edge portions of said second terminal element being of sufficient width to prevent relative tilting of said plate member with respect to said guide means during the movement of said plate member toward its assembled position, one of said members having a guide pin at said other end of said plate member, the other member at said other end having recess means for receiving said pin whereby said pin and said recess means locate said plate member horizontally when said plate member is urged toward its assembled position.

3. A plug-in arrangement for mounting circuit components in a telephone switchboard comprising a mounting plate element and a mounting frame element, means for loosely supporting one portion of said plate element from one portion of said frame element during movement of said plate to its plugged-in position, matching terminal members having corresponding electrical contacts, means for mounting one of said members on said plate element, means for mounting the other of said members on said frame element, a pair of laterally extending guide members, means for mounting said guide members on said frame element, the terminal member mounted on said plate element having transversely extending surfaces engaging said guide members, the engagement between said guide members and said surfaces positively and accurately locating corresponding contacts with respect to each other in the vertical direction, one of said elements having recess means, and the other of said elements having a portion entering said recess means for locating corresponding contacts with respect to each other in the horizontal direction.

4. A plug-in arrangement for mounting circuit components in a telephone switchboard comprising a mounting plate element and a mounting frame element, means for loosely supporting one portion of said plate element from one portion of said frame element during movement of said plate to its plugged-in position, matching terminal members having corresponding electrical contacts, means for mounting one of said members on said plate element, means for mounting the other of said members on said frame element, a pair of laterally extending guide members, means for mounting said guide members on said frame element, the terminal member mounted on said plate element having transversely extending surfaces engaging said guide members, the engagement between said guide members and said surfaces positively and accurately locating corresponding contacts with respect to each other in the vertical direction, said surfaces and said guide members being of sufficient width to prevent relative tilting of said mounting plate element with respect to said frame element, one of said elements having recess means, and the other of said elements having a portion entering said recess means for locating corresponding contacts with respect to each other in the horizontal direction.

MINA M. ARNDT.
*Administratrix of the Estate of Melvin J. Arndt, Deceased.*

REFERENCES CITED

The following references are of record in the file of this patent:

UNITED STATES PATENTS

| Number | Name | Date |
|---|---|---|
| 1,809,025 | Cruser | June 9, 1931 |
| 1,881,503 | Graham | Oct. 11, 1932 |
| 1,882,854 | Mead | Oct. 18, 1932 |
| 1,886,296 | Neir | Nov. 1, 1932 |
| 2,436,786 | Bracke | Mar. 2, 1948 |
| 2,447,572 | Emde | Aug. 24, 1948 |

FOREIGN PATENTS

| Number | Country | Date |
|---|---|---|
| 253,329 | Great Britain | June 17, 1926 |
| 314,660 | Great Britain | July 4, 1929 |

OTHER REFERENCES

Electronics (Magazine), page 214, May 1949.